(12) United States Patent
Apfelbaum

(10) Patent No.: US 7,805,613 B2
(45) Date of Patent: Sep. 28, 2010

(54) TECHNIQUE FOR RECORDING ENTERTAINMENT PROGRAMMING CONTENT WITH LIMITED MEMORY CAPACITY

(75) Inventor: Marc J. Apfelbaum, New York, NY (US)

(73) Assignee: Time Warner Cable, Inc., Stamford, CT (US)

( * ) Notice: Subject to any disclaimer, the term of this patent is extended or adjusted under 35 U.S.C. 154(b) by 1660 days.

(21) Appl. No.: 10/449,991

(22) Filed: May 30, 2003

(65) Prior Publication Data
US 2004/0006698 A1    Jan. 8, 2004

Related U.S. Application Data

(60) Provisional application No. 60/389,017, filed on Jun. 14, 2002.

(51) Int. Cl.
G06F 21/00 (2006.01)
G06F 7/04 (2006.01)
H04N 7/16 (2006.01)

(52) U.S. Cl. .......................... 713/185; 726/26; 725/151
(58) Field of Classification Search ................ 713/185; 726/26; 725/151
See application file for complete search history.

(56) References Cited

U.S. PATENT DOCUMENTS

| | | | | |
|---|---|---|---|---|
| 6,263,346 B1 * | 7/2001 | Rodriquez | ................... | 707/201 |
| 6,345,360 B1 * | 2/2002 | Kamada et al. | ............... | 726/21 |
| 6,473,559 B1 * | 10/2002 | Knudson et al. | .............. | 386/83 |
| 6,532,593 B1 * | 3/2003 | Moroney | ..................... | 725/142 |
| 6,614,987 B1 * | 9/2003 | Ismail et al. | .................. | 386/83 |
| 6,681,396 B1 * | 1/2004 | Bates et al. | .................... | 725/58 |
| 6,792,541 B1 * | 9/2004 | Kusakabe et al. | .............. | 726/1 |
| 6,816,904 B1 * | 11/2004 | Ludwig et al. | .............. | 709/226 |
| 7,103,912 B2 * | 9/2006 | Xia et al. | ........................ | 726/8 |
| 7,146,627 B1 * | 12/2006 | Ismail et al. | .................. | 725/47 |
| 2001/0034220 A1 * | 10/2001 | Berstis | .................... | 455/186.1 |
| 2002/0174430 A1 * | 11/2002 | Ellis et al. | ...................... | 725/46 |
| 2002/0184638 A1 * | 12/2002 | Agnihotri et al. | ............. | 725/89 |
| 2003/0059047 A1 * | 3/2003 | Iwamura | ..................... | 380/201 |
| 2003/0063407 A1 * | 4/2003 | Zimmerman et al. | .......... | 360/68 |
| 2003/0185541 A1 * | 10/2003 | Green | ......................... | 386/46 |

* cited by examiner

Primary Examiner—Techane J Gergiso
(74) Attorney, Agent, or Firm—Straub & Pokotylo; Michael P. Straub

(57) ABSTRACT

A personal video recording (PVR) system and method for allocating limited memory space to multiple users for recording programming content. A selected amount of storage space for storing programing content is allocated for each PVR user. Based on a storage priority protocol, such storage space allocation may change (i.e., increase or decrease) dynamically for additional PVR users. Further, the accessibility of recorded programming content by one or more PVR users and viewing thereof may be subject to different access rights accorded to the users. Based on predetermined storage access and content access protocols associated with each PVR user, certain restrictions may be placed on one or more of these users. For example, a first restriction may relate to the type of programming content that can be recorded or displayed by the PVR for specific user(s). A second restriction may limit designated users from accessing programming content that is stored but associated with another user.

10 Claims, 5 Drawing Sheets

| | 210 | 220 | 230 | 240a | 240b | 250 | 260 | 270 | 280 | 290 |
|---|---|---|---|---|---|---|---|---|---|---|
| | USER | USER ID CODE | STORAGE LOCATION | ALLOCATED STORAGE SPACE | USED STORAGE SPACE | STORAGE PRIORITY | DISK ACCESS PRIORITY | CONTENT ACCESS | PROGRAM LISTINGS | CONTENT CATEGORIES |
| 201 | JOHN | 360 | 10000 | 25 GB | 10 GB | 1 | 1 | 1 | FRIENDS; YANKEES v. RED SOX | COMEDIES; NY YANKEES BASEBALL |
| 203 | MARY | 362 | 12000 | 15 GB | 5 GB | 1 | 2 | 2 | MISSION IMPOSSIBLE II | TOM CRUISE MOVIES |
| 205 | DAVID | 364 | 14000 | 10 GB | 8 GB | 3 | 3 | 4 | SESAME STREET, BARNEY | CHILDREN'S CHARACTER PROGRAMS |

| | 210 | 220 | 230 | 240a | 240b | 250 | 260 | 270 | 280 | 290 |
|---|---|---|---|---|---|---|---|---|---|---|
| | USER | USER ID CODE | STORAGE LOCATION | ALLOCATED STORAGE SPACE | USED STORAGE SPACE | STORAGE PRIORITY | DISK ACCESS PRIORITY | CONTENT ACCESS | PROGRAM LISTINGS | CONTENT CATEGORIES |
| 201 | JOHN | 360 | 10000 | 25 GB | 10 GB | 1 | 1 | 1 | FRIENDS; YANKEES v. RED SOX | COMEDIES; NY YANKEES BASEBALL |
| 203 | MARY | 362 | 12000 | 15 GB | 5 GB | 1 | 2 | 2 | MISSION IMPOSSIBLE II | TOM CRUISE MOVIES |
| 205 | DAVID | 364 | 14000 | 10 GB | 8 GB | 3 | 3 | 4 | SESAME STREET, BARNEY | CHILDREN'S CHARACTER PROGRAMS |

400

TECHNIQUE FOR RECORDING ENTERTAINMENT PROGRAMMING CONTENT WITH LIMITED MEMORY CAPACITY

This application claims under 35 U.S.C. §119(e) the benefit of Provisional Application No. 60/389,017 filed on Jun. 14, 2002.

FIELD OF THE INVENTION

The invention relates to video recording systems and methods, and more particularly to a system and method for allocating limited memory space for recording programming content.

BACKGROUND OF THE INVENTION

Personal video recorders (PVRs), e.g., TiVo and ReplayTV devices, offer a variety of conveniences to users who record and store programming content. For example, these devices enable a user to record programs without having to set a timer, and to store the content without having to insert and set up any such recording medium as a videotape or disk. The recorded programming content can be viewed by the user with functions including: reverse, fast-forward, pause, index, fast/slow play and fast/slow reverse play.

Examples of prior art PVRs are described in U.S. Pat. No. 5,371,551 issued to Logan et al. (the '551 patent), U.S. Pat. No. 6,233,389 issued to Barton et al. (the '389 patent) and U.S. Pat. No. 6,324,338 (the '338 patent) issued to Wood et al. The '551 patent describes a PVR device employing a "circular buffer" which constantly records one or more incoming audio or video programs. Incoming analog broadcast programs are digitized and compressed prior to storage in the buffer, then decompressed and converted back into analog form for playback.

The '389 patent describes a PVR device which allows a user to store selected television broadcast programs while the user is watching or reviewing another program. The program data is compressed pursuant to an MPEG standard and separated into video and audio components for storage.

The '338 patent describes a PVR device having integrated channel guides allowing a user to control recording and storage of television programs into personal channels for later playback and viewing.

A concern common to the prior art PVR designs described above is management of limited storage space for storing desired programming content. A well known solution is to rely on a data compression scheme, e.g., the aforementioned MPEG scheme to compress program data before its storage to effectively utilize the limited storage space. In the event that the storage overflows, the '338 patent suggests that preexisting stored programs be deleted based on their predetermined priority to make room for new programs.

SUMMARY OF THE INVENTION

I have recognized that when multiple users share the same PVR device, the ability to manage the limited storage space becomes even more complicated. For example, if two users share a PVR device, a first user may record and store considerable programming content at the expense of the second user's ability to store his/her desired programming content because of the limited storage space. Thus, it would be advantageous to have a PVR system that enables users to share storage space in a dynamic manner based on the users' needs and amount of available storage space.

Because storage space is a factor that limits the amount of content users can store on a PVR, it would be advantageous to address these multi-user storage space concerns without adversely affecting the amount of overall storage space available to the users.

Further, sharing one PVR device among multiple users often raises security or privacy issues in the context of content access. For example, suppose three users—a husband, wife and their ten year old child—have access to and use the same PVR device. The parents may determine that certain content is appropriate for themselves, but not their ten year old child. It would therefore be advantageous to have a multi-user PVR system where users are granted different access rights to the recorded content.

The invention addresses the storage space management and security concerns arising from multiple users using the same PVR. In accordance with the invention, the storage space of a PVR is allocated to a plurality of users. At least first and second users are associated with allocated storage subspaces, respectively. When a request from the first user for recording selected entertainment programming content is received, which includes data associated with the first user (e.g., a password, personal identification number (PIN), etc.), the selected entertainment programming content is stored in the storage subspace associated with the first user. Based on a storage priority protocol, such storage space allocation may change (i.e., increase or decrease) dynamically for additional PVR users as opposed to an unstructured allocation of storage space as in prior art which may have unintentional adverse impact on one or more of the PVR users who are storing programming content.

In accordance with an aspect of the invention, the accessibility of recorded programming content by one or more PVR users and viewing thereof are subject to different access rights accorded to the users. Based on predetermined storage access and content access protocols associated with each PVR user, certain restrictions can be placed on one or more of these users. For example, a first restriction may relate to the type of programming content that can be recorded or displayed by the PVR for specific user(s). By having such protocols, the PVR effectively prevents designated users from viewing predetermined types of content. Such a restriction, for example, enables parents to determine what type of programming content can and cannot be accessed by a child. A second restriction may limit designated users from accessing programming content that is stored but associated with another user, thereby further preventing the designated users from identifying the stored program content of the other user.

BRIEF DESCRIPTION OF THE DRAWING

Further objects, features and advantages of the invention will become apparent from the following detailed description taken in conjunction with the accompanying drawings showing illustrative embodiments of the invention, in which.

DETAILED DESCRIPTION

Figures 1, 2:
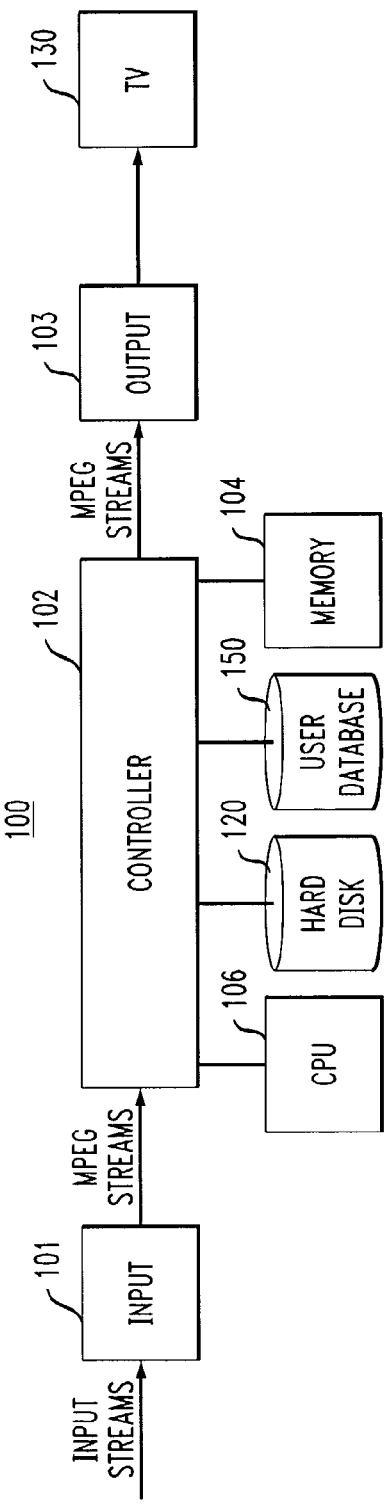
FIG. 1 is a block diagram of a recording system in accordance with one embodiment of the invention.
FIG. 2 illustrates user records having various fields in accordance with one embodiment of the invention.

FIG. 1 illustrates a personal video recorder (PVR) 100 embodying the principles of the invention for recording programming content received, e.g., from a communications network such as a TV broadcast network, cable network, the Internet, etc. For example, PVR 100 in this instance includes an input module 101, controller 102, and an output module 103. The input module 101 is capable of receiving television (TV) input streams in a multitude of forms, for example, National Television Standards Committee (NTSC) or PAL broadcast, and digital forms such as Digital Satellite System (DSS), Digital Broadcast Services (DBS), or Advanced Television Standards Committee (ATSC).

The controller 102 mediates between memory 104, microprocessor 106, hard disk 120 and user database 150. Data in the TV streams is compressed according to a Moving Pictures Experts Group (MPEG) standard, resulting in an MPEG formatted stream for internal transfer and manipulation. The TV MPEG streams are parsed and separated into video and audio components, which are stored in temporary buffers in controller 102.

Events that indicate the type of component (audio and video) that has been stored, where the component is located, and when the component occurred are stored in buffers of controller 102. The program logic is notified that an event has occurred and the data is extracted from the buffers.

The video and audio components are stored on hard disk 120 and, when the program is requested for display, the video and audio components are extracted from hard disk 120 and reassembled into an MPEG stream which is sent to a decoder of output module 103. The decoder converts the MPEG stream into TV output signals and delivers the TV output signals to a TV receiver 130 or some other output device such as a computer monitor. User control commands are accepted and sent through the system. These commands affect the flow of the MPEG stream and allow the PVR user to view stored programs with at least the following functions: reverse, fast-forward, play, pause, index, fast/slow reverse play, and fast/slow play. The interoperations between input module 101, output module 103, memory 104, CPU 106 and hard disk 120 to deliver conventional PVR functions are well known, and described, e.g., in U.S. Pat. No. 6,233,389 which is incorporated herein by reference. Thus, the ensuing discussion focuses on those interoperations effecting the inventive PVR functions to be described.

Specifically, controller 102 not only performs the prior art functions of temporarily storing components in associated buffers, recording events and reassembling the components for display, but also, in accordance with the invention, facilitates division of limited hard disk space among multiple users. In addition, controller 102 maintains user profiles by accessing data relating to users of PVR 100 in user database 150. As described more fully below, data relating to user profiles are accessed by controller 102 and is used for establishing security and disk storage protocols as well as for establishing personalized channels that may be associated with a specific PVR user. A PVR user is any person who is designated to record and/or access programming content from hard disk 120. The specific configuration of hard disk 120 is described below.

FIG. 2 illustrates user records having various fields in user database 150. In this illustrative embodiment, records 201, 203 and 205 comprise the following fields: user name 210, user identification code 220, storage location 230, user storage space 240*a*, used storage space 240*b*, storage priority 250, disk access priority 260, content access 270, program listings 280, and content categories 290. User name 210 is a name selected by the user and, in one embodiment, comprises a string of alphanumeric characters up to a predetermined length. User identification code 220, in one embodiment, comprises a string of alphanumeric characters up to a predetermined length which, in most instances, is selected by the individual user as a password or personal identification number (PIN) associated with his or her PVR user name 210. In another embodiment, the user identification code may include biometric identification data or other personal identification data. In some instances, for example if the PVR user is a young child, user identification code 220 associated with the child PVR user would be selected by another user on behalf of that child.

Storage location 230 stores data relating to the location of a PVR user's stored programming content and further includes data that relates to the specific portion(s) of hard disk 120 in which a PVR user's programming content is stored. In one embodiment, the data in location 230 relates to zones or tracks/sectors of hard disk 120 in which content for a specific PVR user is stored, where the zones or tracks/sectors may or may not comprise contiguous memory addresses.

User storage space 240*a* stores data concerning the amount of disk space of hard disk 120 that is allocated to the users of PVR 100, whereas used storage space 240*a* stores data relating to the amount of hard disk space that is currently being used to store and record programming content. Storage priority 250 stores data relating to the storage priority that is associated to a PVR user. Storage priority data is used to determine whether the amount of storage space that is designated to a PVR user is the maximum disk space available to that PVR user or whether disk space can be added to and/or taken away from that PVR user. For example, in one embodiment, three levels of storage priority exists. User(s) that have a level 1 storage priority can allocate disk space of hard disk 120 among each of the PVR users and can change (i.e., increase or decrease) such allocation among one or more of the PVR users. User(s) that have a level 2 storage priority can maintain the available disk space allocated to that PVR user and, in certain circumstances as described more fully below, increase their allocated disk space. PVR user(s) that have a level 3 storage priority, however, can only use, at a maximum, the disk space allocated to them for storing programming content, cannot increase such allocation on their own and can lose disk space to a level 1 or 2 PVR user.

Disk access priority 260 stores data relating to user accessibility to programming content that is stored on specific portions of hard disk 120 of PVR 100. In one embodiment, three levels of disk access exist. Level 1 permits a PVR user to access and view all presently stored content, including the specific PVR user's content and that of all other users of PVR 100. Level 3 permits a specific PVR user to see only his or her own stored content. Level 2 priority permits a PVR user to access and view his or her own content and any other stored content of users having a level 3 access designation. Such a hierarchy is useful if, for example, a household comprising two parents, a teenage child and a younger child share PVR 100. In such a situation, the parents may want to view all programming content stored on hard disk 120 (level 1) but limit their young child to accessing only the programming content recorded by and/or designated to that younger child (level 3) and thereby restricting the young child from accessing the parents' and teenager's programming content. The parents may further desire that the teenager only have access to his own programming content and that of the younger child, but no access to the parents' programming content— i.e., level 2 access.

Content access 270 stores data relating to the type of programming content that a user may record and/or access using PVR 100. In one embodiment, four levels of content restriction exists. Level 1 permits a PVR user to record any programming content available to PVR 100, whereas level 2 may apply limited restrictions such as all programming content besides that which, for example, has an R rating or Mature Adult (MA) rating. Level 3 restricts programming content that contains violence, nudity and/or offensive language, while level 4 restricts content that may be recorded to only children's programming.

Program listings 280 stores data relating to programing content that have been recorded and are currently stored by one or more PVR users. Content categories 290 stores data relating to the categorization of specific programs or movies for recording. These programs or movies may be categorized by title, actor, genre (subject matter) or some other set of parameters. For example, a PVR user may designate that all episodes of the TV program "Friends" are to be categorically stored or that all movies starring Tom Cruise should be categorically stored. Of course many other parameters such as subject matter (e.g., sports, history, music, situation comedies), subject matter subcategory (e.g., baseball, tennis, football; documentaries, U.S. history; rock and roll music, jazz), and the like, may be established and stored in database 150.

The specific data, fields and records illustrated in FIG. 2 represent only one embodiment of the contents stored in the database of the invention. It is to be understood that the data, fields and records, as well as the number of databases, can be readily modified from the described embodiment and adapted to provide variations for operating the system and method described. Furthermore, each field may contain more or less information. For example, content categories field 290 may be divided into separate fields of only one category or one field may contain data relating to multiple categories.

Hard Disk Configuration

Figure 3:
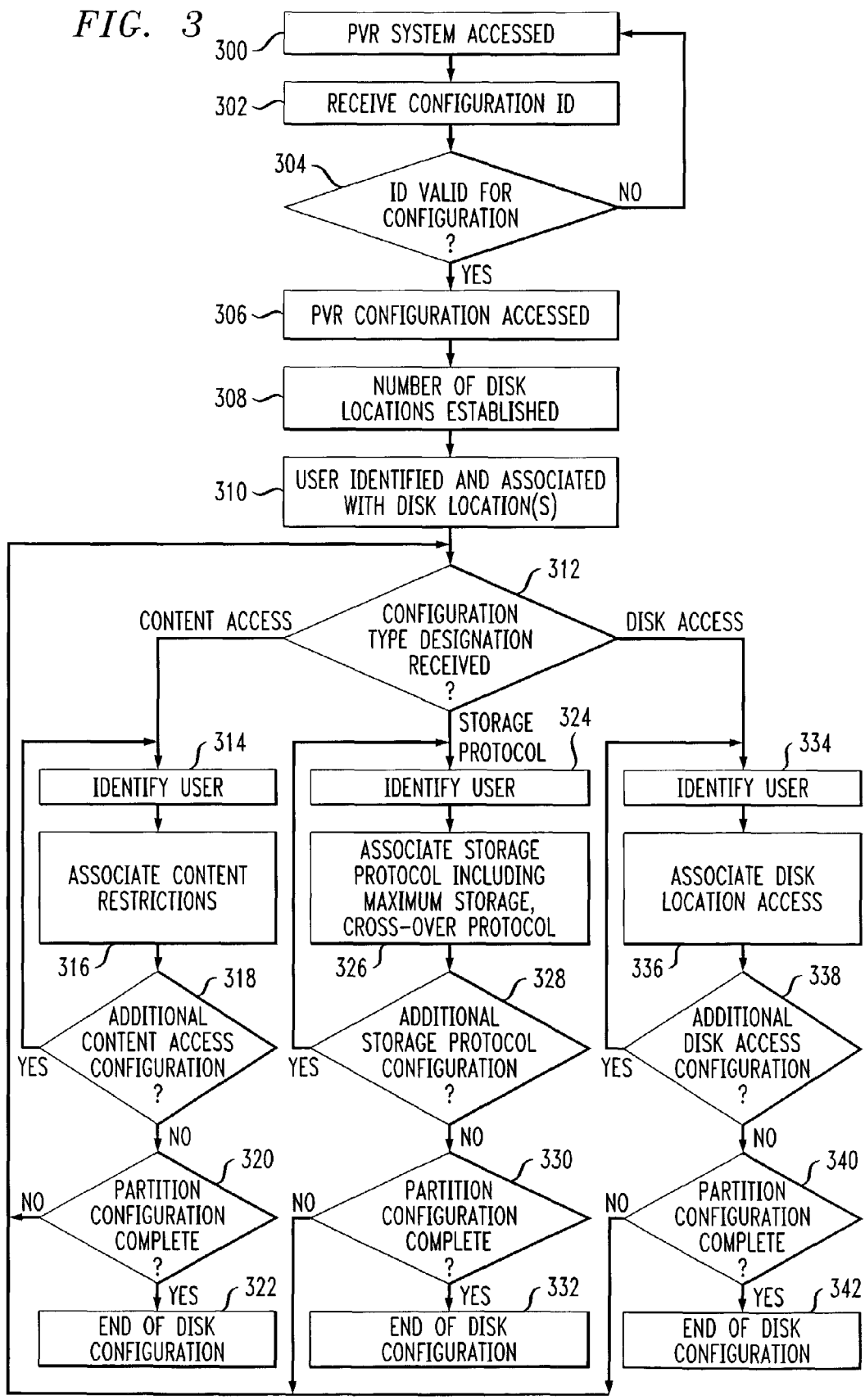
FIG. 3 is a flow chart depicting a process for a disk for multiple PVR users in accordance with one embodiment of the invention.

The hard disk configuration process establishes parameters among multiple users including disk access and storage protocols and content access authorization. Referring to FIG. 3, an administrative user may access PVR 100, for example, through a graphical user interface (GUI) generated by controller 102 on TV 130 (step 300). In another embodiment, hard disk configuration may be effectuated through some other user interface such as a computer or telephone that is in communication with PVR 100. Interaction between the user and the GUI may be accomplished through the use of a remote control having a keypad to transmit commands to TV 130, a computer keyboard in communication with TV 130 or some other device to effectuate such commands.

It may be desired that the ability to configure hard disk 120 is limited to certain PVR users, such as the head(s) of a household. For instance, if a parent sets up PVR 100 such that a child cannot record certain programming content, the parent may not want the child to have access to the password that could effectuate changes to the hard disk configuration which could be used to change the parameters, such as content restrictions settings, that are in place. Thus hard disk configuration may be performed only by person(s) that possess a configuration password or configuration identification number. Such person(s) are referred to herein as "administrative users".

Upon receiving a configuration identification number (step 302), controller 102 determines whether the received identification number is valid (step 304). If the identification number is invalid, the process returns to step 300. If, however, the configuration identification number is valid, then hard disk configuration is allowed (step 306).

Upon accessing hard disk configuration, the administrative user is prompted to enter the number of disk locations to be established on hard disk 120 (step 308). Typically, the number of disk locations is related to the number of people that will be PVR users of PVR 100. Therefore a household of four may decide to have four partitions.

In another scenario, two roommates may wish to have three disk locations—a first personal disk location for one roommate that can only be accessed by the first roommate, a second personal disk location for the second roommate that can only be accessed by that second roommate, and a third disk location in which the two roommates can store programming content and share access to such content. Thus, such a scenario may be desirable if each PVR user wants, for example, a disk location for storing programming content that is accessible by both users and an additional personal disk location for each user which is not accessible by both users.

At step 310, the administrative user is then prompted to identify each of those persons that will be deemed a PVR user. In addition to storing the designated PVR user(s)' user name (s) in user name field 210 of user database 200, each PVR user is assigned a password and a disk location which is associated with each respective PVR user and stored in database 200.

Upon establishing PVR users for PVR 100 with each of their own passwords and storage locations, the administrative user(s) can establish content access, disk access and storage protocols for each PVR user. Establishing such protocols, in effect, creates multiple PVR's, each with different options for each PVR user, within one physical PVR 100.

At step 312, the administrative user chooses whether to configure user's content access, disk access or storage protocols for one or more PVR users. If the content access protocol is selected, the administrative user is prompted to identify a PVR user, at step 314, for which such protocol is to be associated. At step 316, the administrative user selects a desired content access level (as described above) for the specified PVR user and the data respecting such level is stored in field 270 of user database 200. As described more fully above, content access relates to the type of programming content that may be accessed by a PVR user based on the content access configuration data provided by the administrative user, which is stored in database 200 and accessed by controller 102 when a request to record a program is made by a PVR user.

Upon associating a selected content access level with a specified PVR user, the administrative user is then asked, at step 318, whether there are additional PVR users for which content access configuration is required. If additional content access configuration is required, steps 414-418 are repeated until such configuration is completed.

If, however, no additional content access configuration is required, the administrative user then indicates, at step 320, whether the hard disk configuration is complete. If additional hard disk configuration is required, the process returns to step 312 to choose which hard disk attribute is to be configured next. If no additional hard disk configuration is required, hard disk configuration settings are saved in database 200 and hard disk configuration is completed (step 322).

Returning to step 312, administrative user may choose to configure one or more PVR users' storage protocol. If the storage protocol is selected for configuration, the administrative user is prompted, at step 324, to identify a PVR user for which such protocol is to be associated. At step 326, the administrative user selects a desired amount of hard disk space for the selected PVR user as well as a storage priority level (as described above). Data relating to the PVR user's allocated disk space and associated storage priority level are stored in fields 240a and 250, respectively, of user database 200. As described more fully above, storage protocol relates to the amount of hard disk 120 disk space that is allocated to a specified PVR user for storage of programming content and whether such allocation may be increased or decreased without the need for updating the hard disk configuration. The storage protocol is therefore based on a PVR user's allocated storage space and storage priority data which is provided by the administrative user, and is stored in database 200 and accessed by controller 102 when a request to record a program is made by a PVR user.

Upon associating a designated disk space amount and a selected storage priority level for a specified PVR user, the administrative user is then asked, at step 328, whether there are additional PVR users for which storage protocol configuration is required. If additional storage protocol configuration is required, steps 424-428 are repeated until such configuration is completed.

If, however, no additional storage protocol configuration is required, the administrative user then indicates, at step 330, whether the hard disk configuration is complete. If additional hard disk configuration is required, the process returns to step 312 to choose the hard disk attribute to be configured next. If no additional hard disk configuration is required, hard disk configuration settings are saved in database 200 and hard disk configuration is completed (step 332).

Returning once again to step 312, administrative user may choose to configure one or more PVR users' disk access protocol. If the disk access protocol is selected for configuration, the administrative user is prompted, at step 334, to identify a PVR user for which such protocol is to be associated. At step 336 the administrative user indicates the hard disk access level for the selected PVR user (as described above). Data relating to the PVR user's disk access level is stored in field 260 of user database 200. As described more fully above, disk access relates to which hard disk locations may be accessed by a PVR user based on disk access configuration data provided by the administrative user, which is stored in database 200 and accessed by controller 102 when a request to display a stored program is made by a PVR user.

Upon associating a disk access designation with a specified PVR user, the administrative user is then asked, at step 338, whether there are additional PVR users for which disk access configuration is required. If additional disk access configuration is required, steps 434-438 are repeated until such configuration is completed.

If, however, no additional disk access configuration is required, the administrative user then indicates, at step 340, whether hard disk configuration is complete. If additional hard disk configuration is required, the process returns to step 312 to choose which hard disk attribute is to be configured next. If no additional hard disk configuration is required, hard disk configuration settings are saved in database 200 and hard disk configuration is completed (step 332).

Once user configuration is established for PVR 100, the configuration attributes for one or more users may be modified by an administrative user at any time. In one embodiment, if the modification entails changing the number of PVR users and/or the number of disk locations, then the configuration process follows the steps described above with respect to FIG. 3. If, however, the number of users and/or disk locations is not changing, but only one or more attributes associated with one or more PVR users, then administrative user skips steps 306 and 308, but otherwise follows the steps as described above with respect to FIG. 3.

Figure 4:
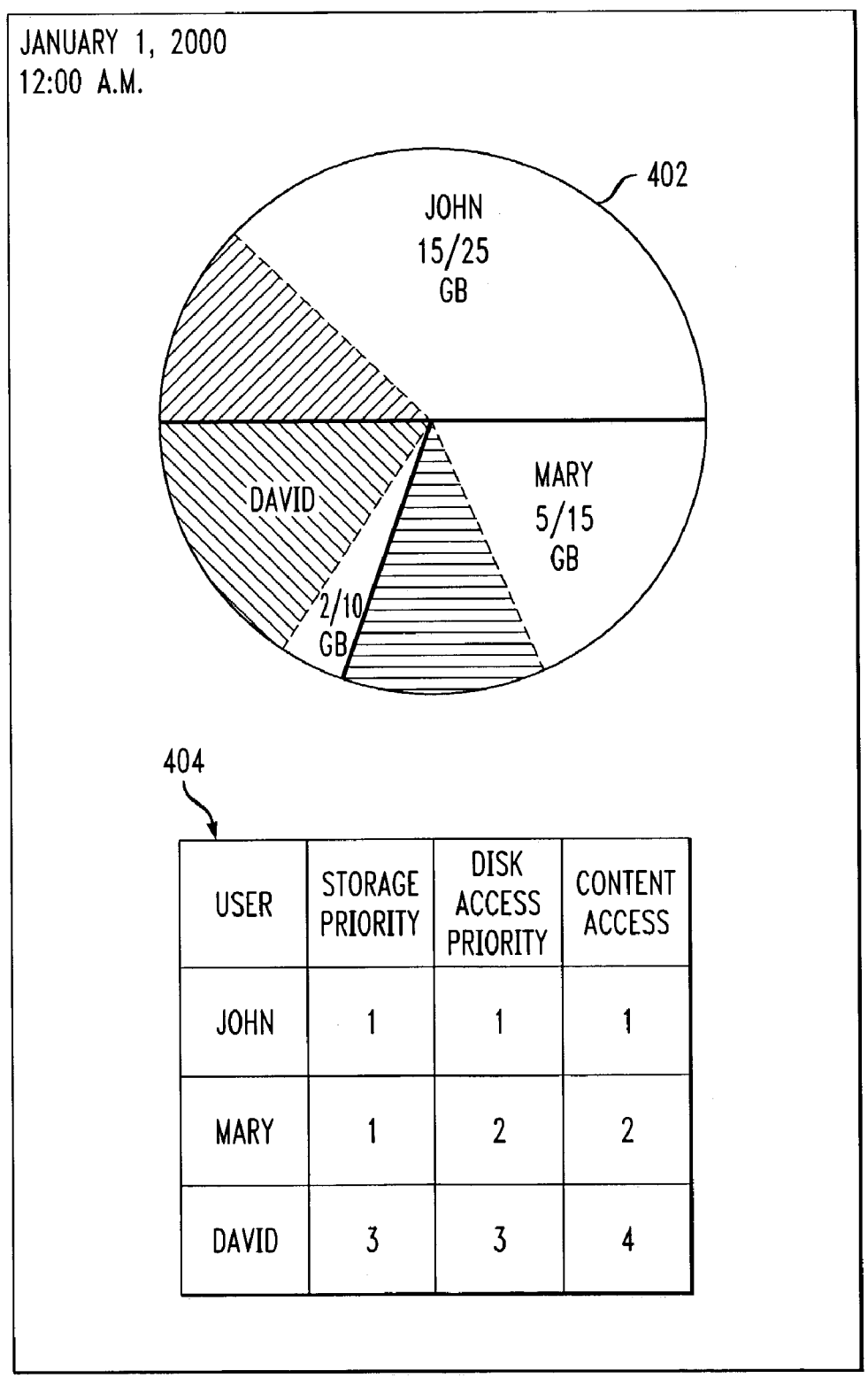
FIG. 4 illustrates a graphical user interface illustrating a visual representation of storage partitioned in accordance with one embodiment of the invention.

FIG. 4 illustrates a GUI that includes table 404 displaying PVR user attributes associated with users of PVR 100 and a graphical representation of a partition of a hard disk, e.g. in chart 402. The GUI may be accessed by a PVR user through the use of a remote control having a keypad to transmit commands to TV 130, a computer keyboard in communication with TV 130 or some other device to effectuate such commands. Pie chart 402 enables a PVR user and/or administrative user to view the amount of disk space that is allocated to each user of PVR 100 and the amount of allocated disk space that is currently available. For example, pie chart 402 indicates that PVR 100 has three users (John, Mary and David), and that, without consideration of the users' storage priority, John has 25 gigabytes of disk space allocated and 15 gigabytes of disk space available for programming storage, Mary has 15 gigabytes of disk space allocated and 5 gigabytes of disk space available for programming storage, and David has 10 gigabytes of disk space allocated and 2 gigabytes of disk space available for programming storage. Further, table 404 of GUI 400 displays the user attributes that have been associated to John, Mary and David based on the user configuration process described above with respect to FIG. 3 and the resultant data stored user database 200.

Referring to the example illustrated in table 404, John has the following user attributes: level 1 storage priority, level 1 disk access priority and level 1 content access priority. By having a level 1 storage priority, John not only has access to his originally allocated 25 GB of disk space (see pie chart 402), but he can use disk space that is designated to David and to Mary, if necessary, to store programming content. Further, by having a level 1 disk access priority, John can access for viewing programming content stored in his hard disk location as well as programming content stored in Mary's and David's hard disk locations. In addition, by having a level 1 content access, John has no restrictions as to the subject matter of programming content that can be recorded or displayed when using PVR 100.

Mary has the following user attributes: level 1 storage priority, level 2 disk access priority and level 2 content access priority. By having a level 1 storage priority, Mary not only has access to her originally allocated 15 GB of disk space (see pie chart 402), but she can use disk space that is designated to John and to David, if necessary, to store programming content. Further, by having a level 2 disk access priority, Mary can access for viewing programming content stored in her hard disk location as well as programming content stored in another user's disk location with the same or higher numbered level of disk access priority—in this case, David's hard disk locations. In addition, by having a level 2 content access, Mary has some limitations as to the subject matter of programming content that can be recorded or displayed when using PVR 100—i.e., Mary may not access programming content that has an R or MA rating.

David has the following user attributes: level 3 storage priority, level 3 disk access priority and level 4 content access priority. By having a level 3 storage priority, David cannot increase his access to disk space beyond his originally allocated 10 GB of disk space (see pie chart 402). In fact, he may lose disk space to John and/or Mary should they require additional disk space to store programming content. Further, by having a level 3 disk access priority, David can only access for viewing programming content stored in his own hard disk location. In addition, by having a level 4 content access, David is restricted to recording and displaying programming content relating to children's programming only.

Recording Programming Content

Figure 5:
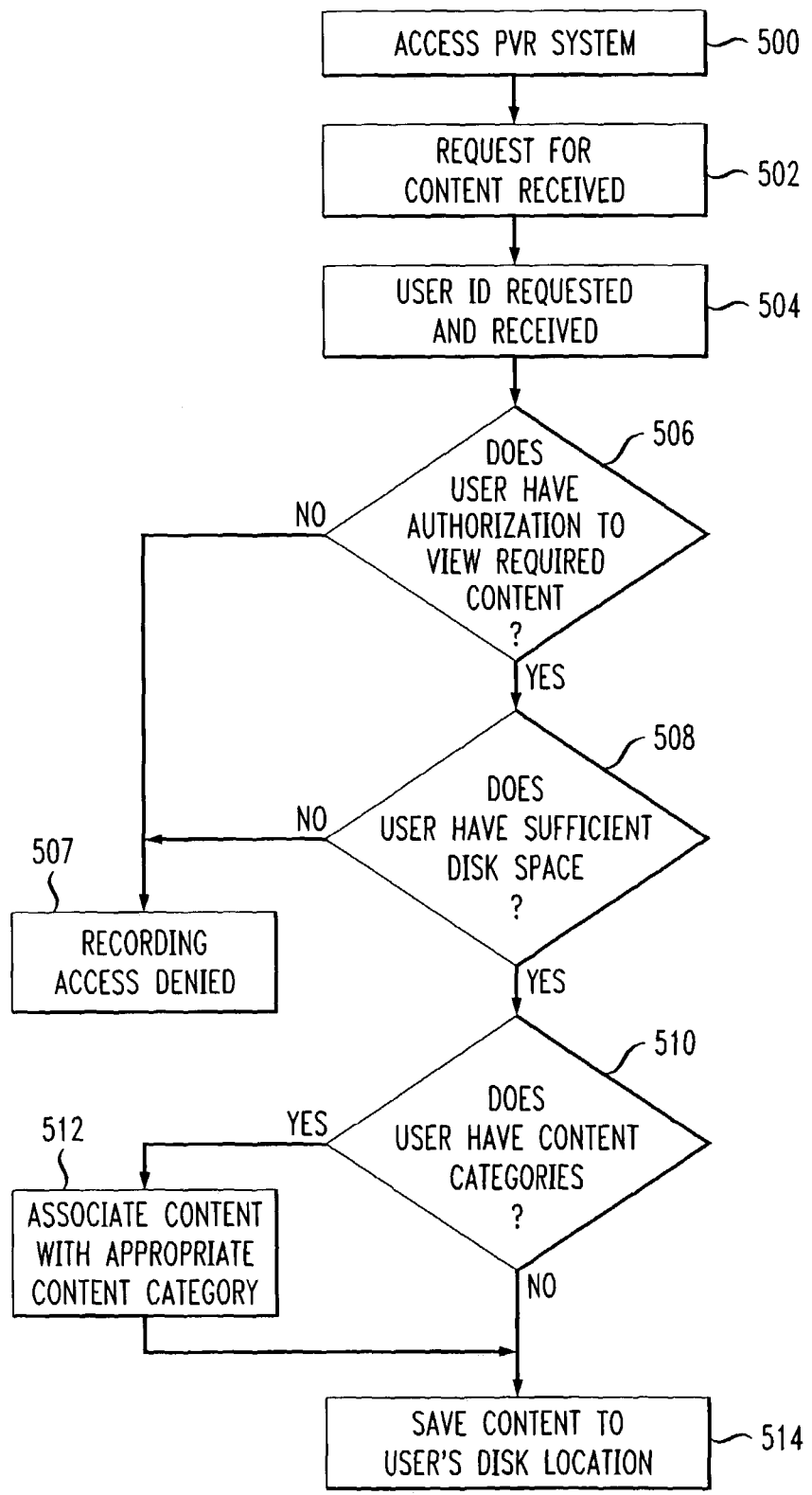
FIG. 5 is a flow chart depicting a process for storing content in accordance with one embodiment of the invention.

PVR 100 enables PVR users to record and store selected programming content. As described above, in some instances, a PVR user is restricted from recording certain programming content due to established disk space, storage priority and/or content access limitations imposed during hard disk configuration of PVR 100. FIG. 5 illustrates the process of recording programming for storage onto hard disk 120 according to one embodiment of the present invention.

At step 500, PVR 100 is accessed by a PVR user. At step 502, the PVR user then selects a program for recording onto hard disk 120 (step 502). Upon receiving such a selection, the PVR user is prompted to enter his or her user identification number and the number is received by controller 102 (step 504). Controller 102 then accesses user database 200 to search for the PVR user's identification number in field 220 for verification that the PVR user has access to PVR 100 and searches for data associated to that PVR user in content access field 270 to determine whether the PVR user has authorization to record the selected program (step 506). By comparing the PVR user's content access level to the content attributes associated with the requested program (e.g., G rating, R rating, violence, sexual content, etc.), controller 102 determines whether the PVR user is authorized to access the selected program for recording. If controller 102 determines that the PVR user is not authorized to access the program for recording, PVR 100 displays a message on TV 130 to the user that access is denied (step 507) and the PVR user returns to the beginning of the process (step 500).

If, however, recording access is authorized, then controller 102 accesses data stored in storage space field 240a and 240b and storage priority field 250 associated with that PVR user to determine whether the PVR user has access to sufficient disk space for storing the selected program (step 508). Such a determination is made by first determining the amount of disk space that is allocated to the PVR user and still available. Available disk space is determined by controller 102 by accessing data in the allocated storage space field 240a and storage space used field 240b of database 200. Controller 102 calculates available disk space to a PVR user by subtracting the disk space associated to a PVR user that has been used (field 240b) from that user's allocated disk space (240a). If the amount of available disk space associated with the PVR user is greater than the amount of disk space required to store the selected program, then controller 102 determines that the PVR user has sufficient disk space to store the program and the program is recorded and stored in hard disk 120.

Further, even if the PVR user does not have a sufficient amount of allocated disk space to store the selected program, depending on the PVR user's storage priority level, the PVR user may nevertheless be able to expand its recordable disk space and record the selected program. For example, as described above, a PVR user with level 1 or 2 storage priority can shift disk space allocation away from a PVR user having a lower storage priority level. In another embodiment, controller 102 may be programmed to automatically shift available disk space from one PVR user to another PVR user when one user needs additional disk space to record a program and another PVR user has excess (unused) disk space. In yet another embodiment, content stored in a PVR user's allocated disk space may be deleted in a predetermined manner to free up disk space to store a program selected for recording.

If controller 102 determines that the PVR user is unable to ascertain sufficient disk space to record the selected program, PVR 100 displays a message that access is denied (step 507) and the PVR user returns to the beginning of the process (step 500).

If, however, the PVR user has sufficient disk space to record the selected program, then central controller 102 accesses content category field 290 of database 200 to determine whether the PVR user has established content categories or channels within his or her own personal storage location (step 510). If controller 102 determines that no content categories have been established, then the recorded program is stored in any random location within the PVR user's disk storage location. (Data relating to the stored program—e.g., title, program description, length of program, location of program on hard disk 120—is stored in program listing field 280 of database 200.) If, however, controller 102 determines that content categories have been established, the selected program is associated with the appropriate content category (step 512) and the programming content is then saved within the PVR user's allocated disk location (step 514).

Accessing Stored Content

Figure 6:
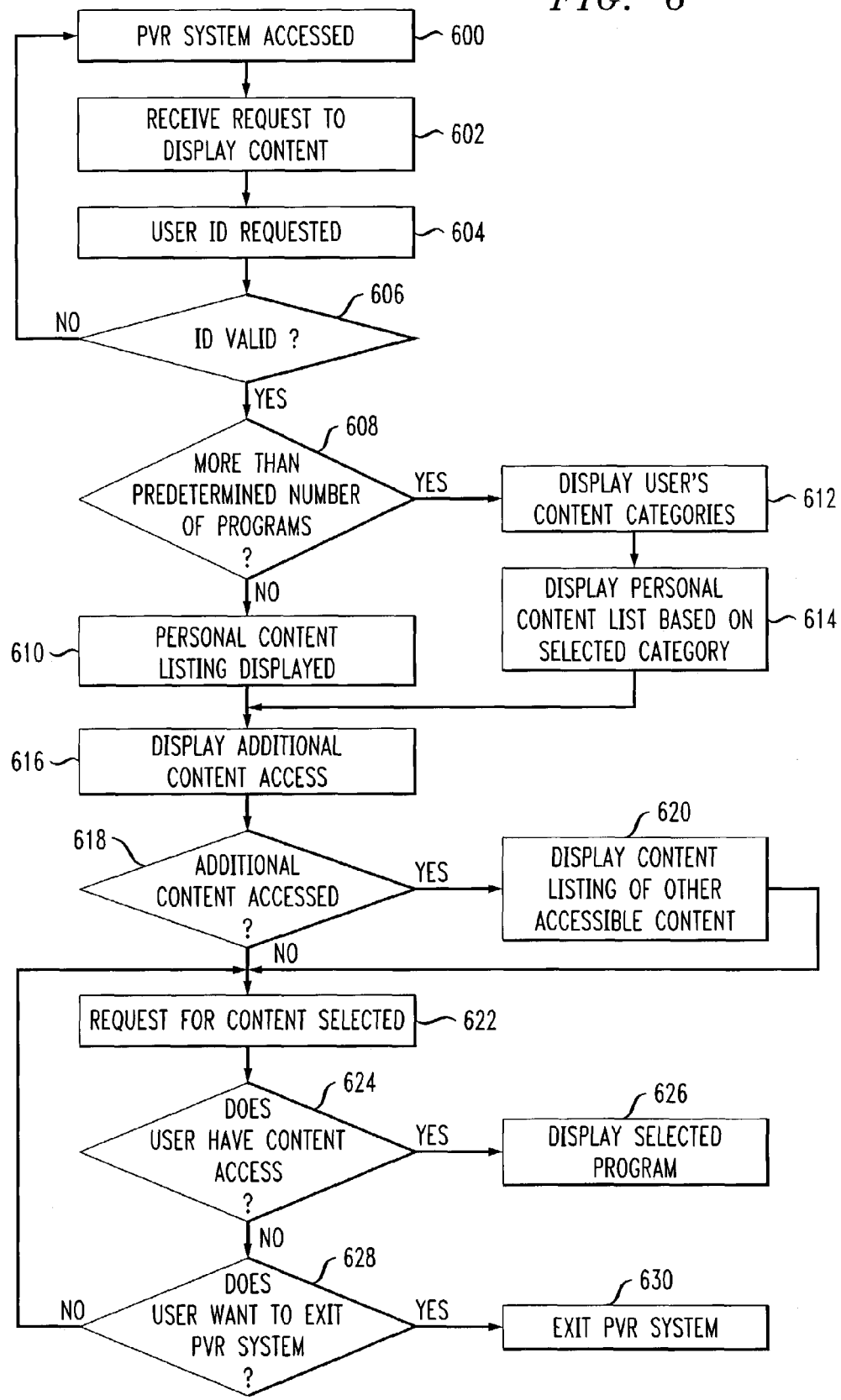
FIG. 6 is a flow chart depicting a process for accessing content in accordance with one embodiment of the invention.

PVR 100 enables users to access content that is stored on PVR 100. As described above, in some instances, a PVR user is restricted from accessing certain content that is stored on hard disk 120 when the PVR user's disk access priority attributes impose such limitations. FIG. 6 illustrates accessing programming content stored on hard disk 120 according to one embodiment of the present invention.

At step 600, PVR 100 is accessed by a PVR user. At step 602, the PVR user indicates that a request to display a program that has been recorded and stored on hard disk 120 is being made. Upon receiving such a request, the PVR user is prompted to enter his or her user identification number and the number is received and by controller 102 (step 604). Controller 102 then accesses user database 200 to search for the PVR user's identification number in field 220 and thereby verifies that the PVR user has access to PVR 100 (step 606). If the PVR user's identification code is invalid, the PVR user returns to step 600.

If, however, the PVR user's identification code is valid, controller 102 accesses data from the program listings field 280 of user database 200. In one embodiment, if, at step 608, the number of program listings associated with the PVR user is less than a predetermined number, then the PVR user's personal program listing is displayed (step 610) as well as a menu of other PVR user's program listings that may be accessed (step 616), if any. As described above, whether a PVR user can access another PVR user's program listings depends on the disk access level associated with that PVR user.

If, however, at step 608, the number of program listings associated with the PVR user is greater than a predetermined number, user content categories associated with the PVR user are displayed (step 612) and the PVR user's personal content list is displayed based on a selected content category (step 614). In one embodiment, content categories based on the subject matter of the stored programs are automatically generated by PVR 100 if categories are not defined by the PVR user. Further, the PVR user can also select from another PVR user's programming content list if, based on the PVR user's access level, such listings are available. Whether such listings are available depends on the PVR user's disk access priority level and whether other PVR users have programs stored on hard disk 120.

If the PVR user has access to another user's content listing, the PVR user is prompted to indicate whether such listings are to be displayed (step 618). If the PVR user wants to select a program from his or her own listing only, then a request to access a program among the PVR user's own listing is made at step 620. If, however, the PVR user wants to view the program listing(s) from other PVR users, the program listings of other PVR user's, if available, are displayed (step 620) and the request to access a program is made (step 622).

Once a program is selected, controller 102 determines whether the PVR user is authorized to access the programming content that has been selected for display (step 624). If, based on the PVR user's content access level and the content attributes of the requested program, the PVR user is authorized to access the requested program, then such program is displayed for viewing (step 626).

If, however, the PVR user does not have authorization to access the content of a requested program, the PVR user is prompted to either exit PVR 100 (steps 628 and 630) or to return to the program listing display for program selection (step 628 and 622).

The foregoing merely illustrates the principles of the invention. It will thus be appreciated that those skilled in the art will be able to devise numerous other arrangements which embody the principles of the invention and are thus within its spirit and scope.

For example, PVR 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A video content recording and playback system, comprising:
    a personal video recording (PVR) system including:
        an input coupled to a communications network for receiving television input streams communicated over said communications network;
        a storage controller for dynamically allocating storage space on a hard disk included in the PVR system for storing entertainment programming content obtained from said television input streams to a plurality of users of the PVR system, the controller being configured to allocate separate storage subspaces on the hard disk to each of the plurality of users;
        an interface for receiving a request from at least one of the plurality of users for recording or playback of selected entertainment programming content, a personal identifier being associated with the request, said personal identifier including at least one of a personal identification number (PIN) and a biometric identifier associated with the least one of the plurality of users;
        wherein said storage controller is responsive to the request for recording or playback of the selected entertainment programming content, said storage controller controlling storage of the selected entertainment programming content when said request is a request for recording and said storage controller controlling retrieval of requested content when said request is a playback request, said storage controller maintaining user profiles relating to each of the plurality of users of the PVR system in a user database, each individual user profile including a storage priority, a disk access priority, a content access priority program listings information corresponding to the user to which the individual user profile corresponds;
        wherein said storage controller is configured to use the storage priority level associated with a user to determine whether disk subspace allocated to the user can be taken away from said user when dynamically reallocating storage space in response to a request from another user;
        wherein said storage controller is further configured to use the disk access priority associated with a user to determine the user's right to access stored content including the content of other users of the PVR system;
        wherein said storage controller is further configured to use said content access priority associated with a user to determine the types of entertainment programming content the user is permitted to record and access using the PVR system; and
        wherein the program listing associated with a user indicates content that has been recorded and is currently stored by the user.

2. The video content recording and playback system according to claim 1, further comprising:
    a television for displaying television signals output by said personal video recording system.

3. The video content recording and playback system according to claim 1, wherein the personal identifier includes a personal identification number (PIN).

4. The video content recording and playback system according to claim 1, wherein said storage controller is configured to allocate a first storage subspace to said at least one of the plurality of users, said first storage subspace including at least two memory segments which are not contiguous.

5. The video content recording and playback system of claim 1, wherein said user database further includes, for each of said plurality of users, content category information associated with said user.

6. The video content recording and playback system of claim 1, wherein said system is a personal video recorder including a single hard disk providing said storage, said single hard disk being said hard disk.

7. The video content recording and playback system of claim 1, wherein said television input streams are MPEG streams communicating video and audio content.

8. The video content recording and playback system of claim 1, wherein said communications network is a cable network.

9. The video content recording and playback system of claim 1, wherein said television input streams are television broadcasts.

10. The video content recording and playback system of claim 1, wherein said storage controller is configured to provide different users different levels of storage priority, said different levels of storage priority including: i) a first level of storage priority which indicates a user is allowed to allocate storage space among users and change the allocation of storage space to users; ii) a second level of storage priority which indicates a user is allowed to maintain the available storage space allocated to the user; and iii) a third level of storage priority which indicates a user is limited to, at most, using the storage space allocated to the user and the user can lose storage space to another user having a higher storage priority.

* * * * *